United States Patent [19]

Phillips

[11] Patent Number: 4,669,763
[45] Date of Patent: Jun. 2, 1987

[54] GRIPPING SADDLE AND O-RING APPARATUS

[76] Inventor: Edwin D. Phillips, 700 Cedar Ave., Middlesex, N.J. 08846

[21] Appl. No.: 683,718

[22] Filed: Dec. 19, 1984

[51] Int. Cl.$^4$ ............................................. F16L 19/03
[52] U.S. Cl. ................................... 285/346; 285/354; 285/911; 422/99
[58] Field of Search ............... 285/DIG. 12, 345, 346, 285/354; 422/99, 103

[56] References Cited

U.S. PATENT DOCUMENTS

| | | | |
|---|---|---|---|
| 2,672,053 | 3/1954 | Geyer | 422/99 |
| 3,178,206 | 4/1965 | Martin et al. | 285/DIG. 12 |
| 3,207,644 | 9/1965 | Hobson, Jr. et al. | 285/DIG. 12 |
| 3,282,289 | 11/1966 | Vick | 137/375 |
| 3,323,874 | 6/1967 | Phillips | 422/103 |
| 3,341,210 | 9/1967 | Vick | 277/165 |
| 3,679,237 | 7/1972 | De Angelis | 285/DIG. 12 |
| 3,692,338 | 9/1972 | Nick | 285/DIG. 12 |
| 3,743,329 | 7/1973 | Wesel, Sr. | 285/DIG. 12 |
| 3,819,212 | 6/1974 | St. John et al. | 285/356 |
| 3,977,709 | 8/1976 | Hatzis | 285/DIG. 12 |
| 3,997,198 | 12/1976 | Linder | 285/98 |
| 4,127,286 | 11/1978 | Albertsen | 285/DIG. 12 |
| 4,509,566 | 4/1985 | Phillips | 210/91 |

Primary Examiner—Cornelius J. Husar
Assistant Examiner—Eric K. Nicholson
Attorney, Agent, or Firm—Shoemaker and Mattare, Ltd.

[57] ABSTRACT

A gripping saddle and O-ring apparatus comprising a hub structure having a central aperture therethrough, resilient flanges extending from each end of said hub structure and integral therewith, and thus providing a central groove therebetween for reception of a resilient O-ring therewith. Depending upon the size of the O-ring, the flanges will be only slightly deformed outwardly or greatly deformed outwardly. When this structure is used with laboratory apparatus containing corrosive liquids, the embodiment with slightly expanded flanges is preferred, while when the apparatus is used for stop cock securing functions, the greatly deformed flange apparatus is preferred.

Preferably, the saddle hub structure is made of Teflon or other fairly slippery and non-frictional plastic material, while any type of rubber or rubber composition may be employed for the O-ring. By separating the O-ring from any direct contact with corrosive liquids, the rubber or rubber-like material which is normally non-resistant to such corrosive liquids is fully protected therefrom. However, the resiliency and inherent retention bias force with such a rubber O-ring is important in combination with the plastic of the saddle hub which has a tendency to creep or flow as time passes.

An embodiment uses two or more O-rings, and hub structure having double (or more) pairs of resilient flanges. A further modification includes a plurality of grooves, or threads internally of the hub structure.

1 Claim, 17 Drawing Figures

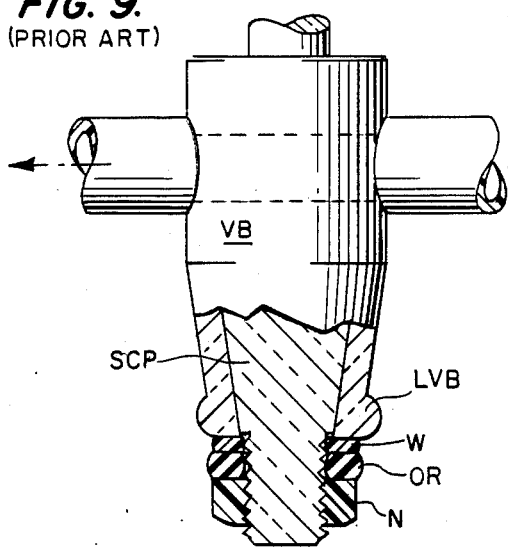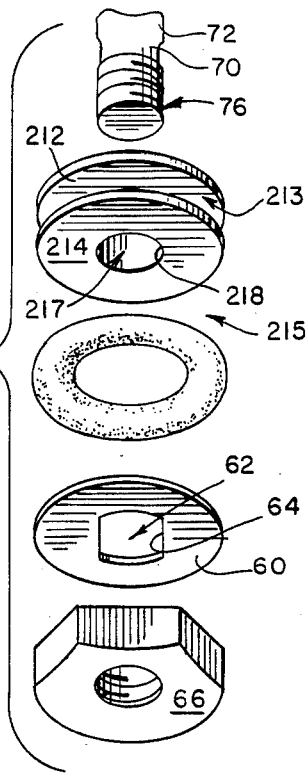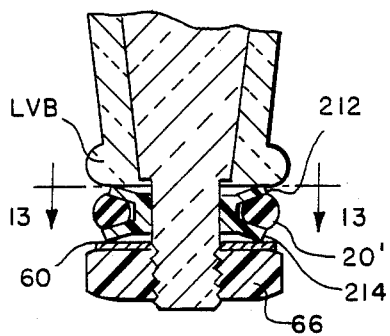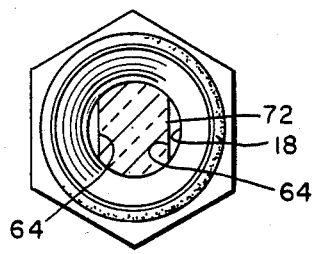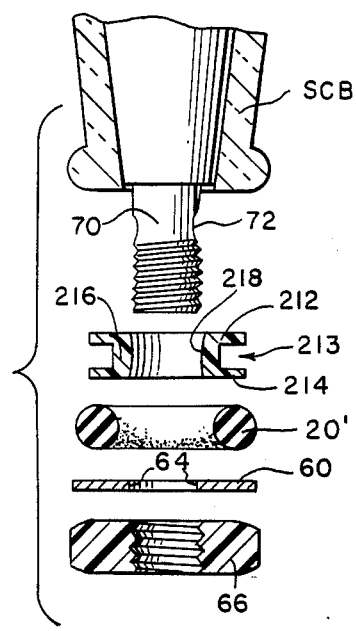

GRIPPING SADDLE AND O-RING APPARATUS

BACKGROUND OF THE INVENTION

1. Field of the Invention

This invention relates generally to devices for use in laboratories with laboratory apparatus and the like to prevent contact of corrosive material with conventional rubber O-rings and the like which commonly are provided with such apparatus.

2. Description of the Prior Art

A common problem with known devices of conventional type for preventing leakage and sealing couplings with tubing, filters, and the like is that conventional type rubber O-rings when in contact with certain types of chemical solutions and other corrosive materials, will tend to disintegrate and thereby leak.

There have been devices made to prevent contact of rubber O-rings with such corrosive materials, but generally these are either elaborate and complicated, or expensive and, oftentimes, they are far less effective than desired.

Existing prior art patents which may be pertinent to the present invention are as follows:

U.S. Pat. No. 3,282,289—11/1/66
U.S. Pat. No. 3,341,210—9/12/67
U.S. Pat. No. 3,819,212—6/25/74
U.S. Pat. No. 3,997,198—12/14/76

Vick U.S. Pat. No. 3,341,210 and St. John U.S. Pat. No. 3,819,212 disclose use of a Teflon ring in contact and sealing against a surface, contact being maintained by an O-ring. However, neither of these devices are used with laboratory apparatus, nor are they for the purpose of providing a seal which will not be affected by corrosive fluids as utilized in the apparatus, and yet maintain such seal.

None of the known prior art devices offer the new and novel features of the present invention.

SUMMARY OF THE INVENTION

An object of the present invention is to provide a gripping saddle and O-ring apparatus which will provide a positive sealing structure, and yet be resistant to corrosive materials with which the device is associated.

Another object of the present invention is to provide a saddle and O-ring sealing structure which is corrosive resistant and which can be used to join and seal several different components, such as a thermometer within a mount, to join two sections of glass tubing, to support and hold a replaceable filter element, and to be used between a washer and nut assembly on a stop cock to prevent loosening of the nut during repeated use of the stop cock.

A further object of this invention is to provide a Teflon saddle of specific construction for holding an O-ring so that under compression, both the saddle and ring will be formed in a desired manner for sealing purposes. Also, the Teflon saddle will prevent contact of corrosive materials with the O-ring, and thus eliminate the problem of destruction thereof.

A still further object of the present invention is to provide for deformable sealing structure which is resistant to corrosive material and which can be used in many different manners for coupling laboratory apparatus together, and/or sealing component laboratory apparatus in various manners.

The present invention has a number of new and useful features. The saddle, which is preferably formed of Teflon, which is a corrosive resistant plastic, can always be in contact with corrosive material and this saddle forms a seal which is maintained by a resilient rubber O-ring which is supported within a groove in the saddle. The O-ring maintains the sealing pressure of the saddle flanges; however, never is the O-ring itself in direct contact with any liquid or corrosive material. Therefore, the combination structure can be used to couple a thermometer in a leakproof manner with a support housing, can be used to join two pieces of glass tubing together in a leakproof coupling connection, can be used to hold a replaceable filter element with appropriate laboratory apparatus, and it can be used to eliminate inadvertent loosening of a lock nut as associated with an adjustable stop cock.

The apparatus comprises a saddle hub portion, preferably made of Teflon, the saddle hub being cylindrical with an aperture through the center thereof and a circumferential groove completely therearound. Within the groove a resilient, flexible rubber O-ring of suitable size is mounted. The combination of these two elements forms the basic structure of the present invention. Under compression both the saddle hub and the O-ring are suitably deformed, but at all times the Teflon saddle hub will prevent direct contact of any corrosive material with the rubber O-ring. Thus, no matter how the sealing apparatus is used, it is assured that the O-ring itself will not be destroyed or rendered less effective by contact with corrosive materials.

These together with other objects and advantages which will become subsequently apparent reside in the details of construction and operation as more fully hereinafter described and claimed, reference being had to the accompanying drawings forming a part hereof, wherein like references numerals refer to like parts throughout.

BRIEF DESCRIPTION OF THE DRAWINGS

FIG. 9 depicts a prior art stop cock structure.

FIG. 10 is an exploded perspective view of use of the present invention with such stop cock structure.

FIG. 11 is an exploded elevational view, partly in cross-section, of the elements of FIG. 10.

FIG. 12 is a cross-sectional elevational view of the components of FIGS. 10 and 11 as assembled.

FIG. 13 is a view taken along line 13—13 of FIG. 12.

DESCRIPTION OF THE PREFERRED EMBODIMENTS

Figure 1:
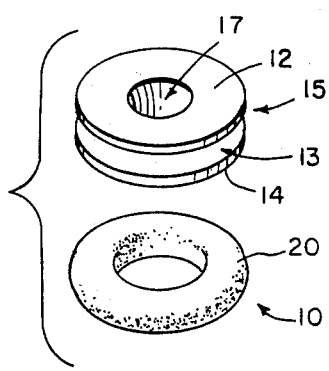
FIG. 1 is a perspective view of the saddle and O-ring apparatus of the present invention.
Figure 2:
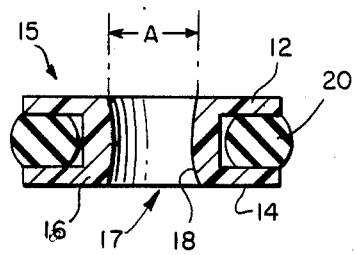
FIG. 2 is a cross-sectional view taken across the midsection of FIG. 1 showing the saddle hub and O-ring as combined.

Referring to FIG. 1 of the drawings, reference numeral 10 indicates in general the gripping saddle and O-ring apparatus of the present invention. The saddle structure 15 comprises side flanges 12 and 14 extending peripherally from a central hub 16 and is shown in FIG. 1. As best seen in FIG. 2, an aperture 17 through the hub 16 has a slightly semi-circular configuration 18 in cross-section. Thus, the smallest diameter A between the mid-portion of the aperture is less than the diameter of the apertures at the flanges. The resilient O-ring 20 when mounted within the groove 13 provided between flanges 12 and 14 of the hub saddle structure will be slightly deformed. This deformation serves the purpose of applying slight pressure outwardly on the two flanges 12 and 14 of the saddle support hub. Thus, the hub structure, which is made of plastic, preferably Teflon, which has a tendency to creep over a period of time and lose its tension properties, will always be under some biasing force due to the resiliency of the rubber O-ring 20. This is another very desirable benefit of this structure.

Figure 3:
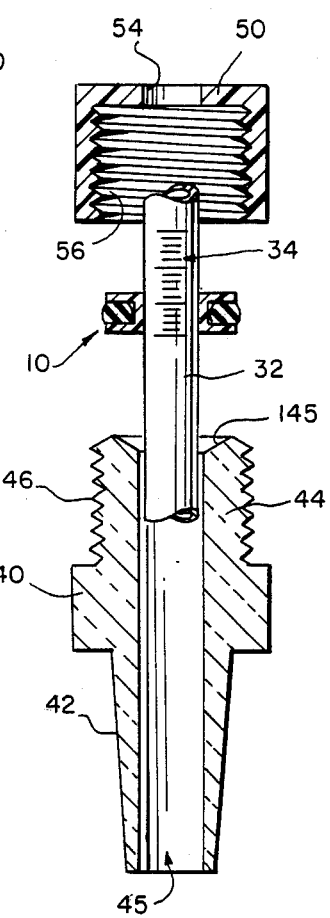
FIG. 3 is a side view, partly in cross-section, of the sealing apparatus of the present invention as in use to hold a thermometer within a support housing.
Figure 4:
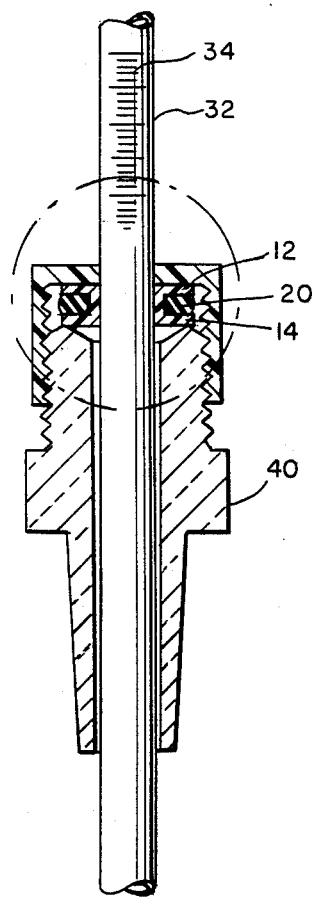
FIG. 4 is a view of the elements of FIG. 3 after assembly and securement thereof.
Figure 5:
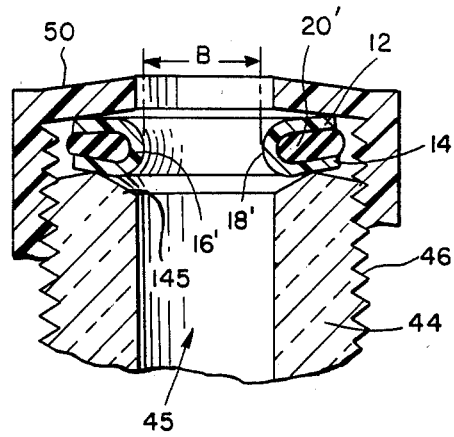
FIG. 5 is an enlarged cross-sectional view of the sealing portion of the FIG. 3 and FIG. 4 embodiment, showing how the saddle hub and O-ring deform under dompressive force.

FIGS. 3-5 show the use of the embodiment of FIGS. 1 and 2 for sealingly coupling a thermometer 34 within a housing 44 for supporting same. The housing 44, commonly known as a thermometer adapter, has an extension 42 with a slight taper on the outside circumference thereof extending from the main body 40. A central aperture 45 is provided longitudinally of this thermometer adapter. An extension 44 having external threads 46 is also provided on the adapter 44, as well as a conical recess 145 surrounding the longitudinal aperture at the other end thereof. A compressive nut or cap 50 complements the extension 44 by means of internal threads 56 which engage with threads 46. An opening 54 at the closed end of the cap provides egress for the thermometer 32. Appropriate thermometer markings 34 are shown on the thermometer 32. The sealing device 10 of the present invention is secured between the cap 50 and the extension 44.

As shown best in FIG. 5, when the cap 50 is tightened on the sealing device structure 10, the angle of the conical recess 145 deforms the thin wall of the hub saddle tending to move it parallel to the angle of the conical recess. This deformation will force the hub 18' to have a lesser diameter B than the original diameter A. That is, the effective diameter B will become smaller and, therefore, the plastic material of the saddle 15 will tightly engage against the thermometer 32. The resilient O-ring 20 in the groove 13 as it is defomred will maintain a uniform outward pressure on the inner portions of the flanges 12, 14 of the hub saddle. This will insure uniform deformation of the saddle walls or flanges 12, 14 and produce a very effective seal at all points thereof. The resilient O-ring, preferably of rubber, because of its characteristics will maintain constant pressure on the walls or flanges of the saddle to maintain the sealing pressure, even if the plastic of the saddle should tend to creep or flow.

Figure 6:
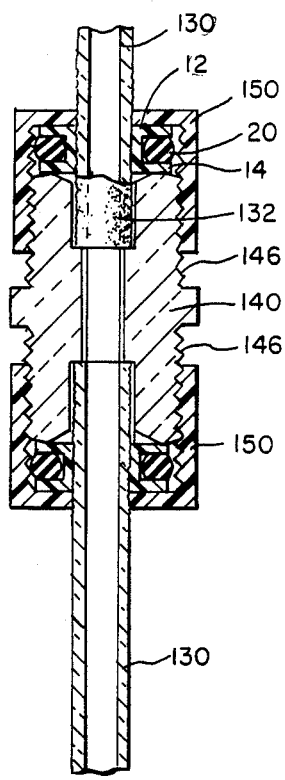
FIG. 6 shows in side elevation, in cross-section, two saddle hubs and O-ring combinations of the present invention together with a single coupling element for coupling two glass tubing ends together.

In FIG. 6 the sealing structure 10 of the present invention is used with a double coupling for coupling the ends of two pieces of glass tubing together. The glass tubing 130 each has an end outer peripheral surface 132 which is sandblasted, etched or otherwise roughened to form a good frictional outer surface thereof. At each end of the coupling housing 140 external threads 146 are provided which complement caps 150 having similar internal threads therewith. By tightening of the end caps 150 upon the housing extensions, which have conical angled surfaces 145' therewith, a compressive deformation will take place as already described with reference to FIG. 5. Of course, upon suitable tightening, a leakproof and semi-permanent coupling is formed between the two pieces of glass tubing 130.

Since the design of this structure is such that the saddle hub 15 isolates the rubber O-ring from any contact with corrosive liquids, the type of rubber used for the O-ring is relatively unimportant.

Figure 7:
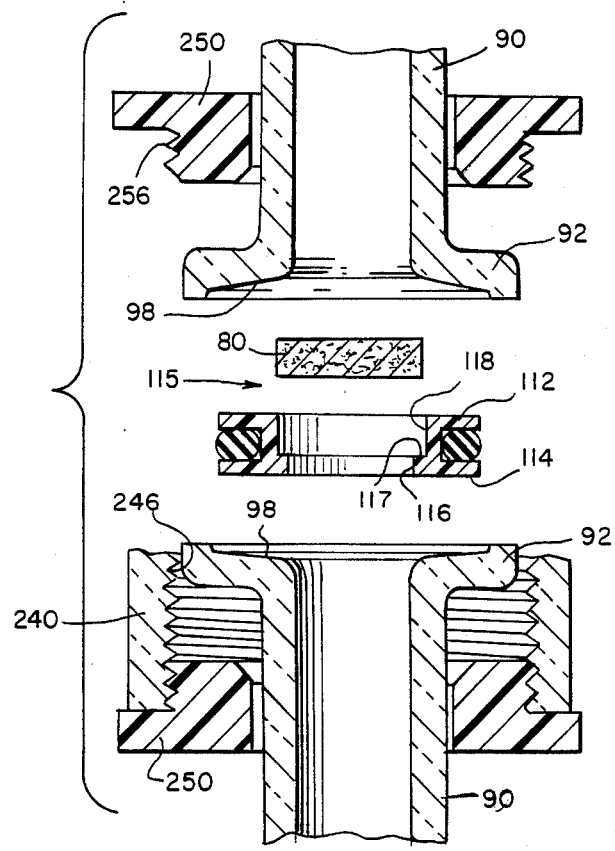
FIG. 7 is an exploded view, somewhat enlarged, in side elevation showing the use of a modified saddle hub and O-ring combination for holding a replaceable filter structure between two flanged tubes and couplings.
Figure 8:
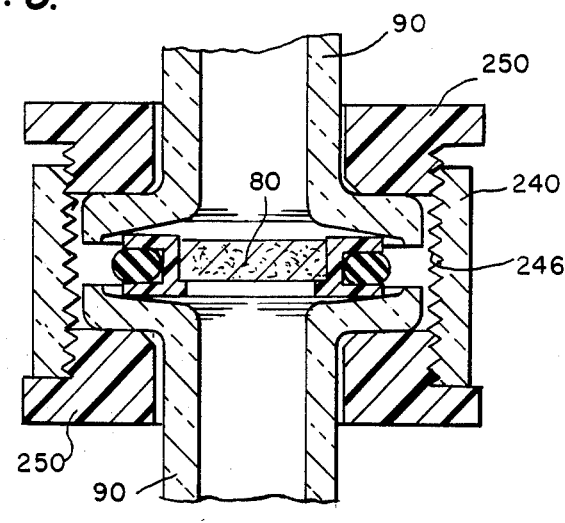
FIG. 8 is a cross-sectional view of the components of FIG. 7 as assembled and under compressive forces.

FIG. 7 shows the use of a modified embodiment of the present invention for holding a filter disc. At the present time filters using such fritted discs are permanently placed into the glass equipment. In order to clean these filters, therefore, it is necessary to disassemble the equipment and burn out the dirt from the filter. This, of course, is both a time consuming and relatively costly procedure. By using a modified sealing apparatus as shown in FIGS. 7 and 8, such a filter disc 80 can be easily removed and thrown away, thereby eliminating the necessity for cleaning it. Of course, it is very easy to insert a completely new disc in place of the old one.

In this embodiment, the sealing saddle hub 115 has a shoulder 117 formed between the hub aperture periphery 116 and the larger aperature periphery 118. The diameter of the hub portion 118 is just slightly larger than the outer diameter of filter disc 80 so that upon insertion thereof, the filter disc will be supported by the shoulder 117. Respective side flanges 112 and 114 are provided with this modified saddle hub.

Glass or plastic tubing 90 having enlarged flanged ends 92 therewith support on either side the assembled filter disc and sealing apparatus. A coupling housing 240 having internal threads 246 mate with clamping nuts 250 having external threads 256 therewith. As is obvious, as the nuts 250 are tightened, as best seen in FIG. 8, the sloping conical surfaces 98 at the respective flanged ends 92 of the tubings 90 will cause deformation and compression of the flanges 112, 114 in a manner similar to that already described with reference to FIG. 5. Thus, again a semipermanent leakproof seal, together with the filter disc holder, is provided by this invention.

FIG. 9 shows another use of the apparatus of the present invention. FIG. 9 is a prior art type stop cock provided with a stop cock plug SCP, a valve body B, a washer W, an O-ring OR, and a lock nut N. As is conventional, the lock nut N will compress the O-ring OR to force the washer W against the lower end of the stop cock valve body LVB and secure the stop cock plug SCP securely within the structure.

Normally, to prevent loosening of the nut N, the washer W is provided with a flat-sided hole which fits over a flat-sided stem of the stop cock plug. This insures that the washer rotates with the plug. However, it has been discovered in actual practice that due to tolerances between the surfaces, there is some lost motion. This produces a small movement between the flat washer, the O-ring and the nut. Since the O-ring is flexible, it tends to creep circumferentially a very small amount each time the stop cock is rotated. Therefore, in time this quite commonly causes the nut to loosen rather than tighten. Of course, this is objectionable.

The effect of such circumferential creep due to the rubber is eliminated by the use of the present sealing apparatus. Since the rubber O-ring of the present device is isolated from the rotational forces on the assembly, and also because it maintains a constant pressure on the saddle hub for the purpose of eliminating the effect of plastic creep and the changing of the sealing pressure over a period of time, the use of the present invention greatly increases the secureness of the conventional stop cock apparatus.

As best seen in FIGS. 10 and 11, the saddle hub 215 has an aperture 217 therethrough and with the inner surface of the hub 218 having the semi-circular configuration as already shown and described as 18 in FIG. 2 of the drawings. Preferably, an O-ring 20' which has a slightly larger cross-sectional diameter is used with this embodiment. This causes, as best seen in FIG. 12, the side flanges 212 and 214 to be expanded outwardly after the O-ring has been mounted upon the hub saddle. A flat washer 60 having an aperture 63 therethrough with flat sides 64 complements and engages with flat surfaces 72 on the end of stop cock plug extension 70. The stop cock extension 70 has external threads 76 for engagement with the internal threads of the lock nut 66. When the saddle hub and O-ring of the present invention are installed, as best seen in FIG. 12, the lock nut 66 is tightened on extension 70, the outer tips of flanges 212 and 214 will be compressed between the lower surface of the stop cock body LVB and the upper surface of the washer 60.

In actual use, the flexible washer has the flat-sided aperture therethrough, and therefore the hub wall thickness will not be uniform. The deformation due to the compressive force of the rubber O-ring 20' will not produce sufficient force on the flat-sided stem to assure that all lost motion will be eliminated. Therefore, in order to eliminate all the lost motion, the flat washer 60 must still be used. The material and surface finish of this washer is chosen to produce the highest frictional force between the flat washer 60 and the flexible saddle flange 14', that is, much higher than the frictional force between the lower surface of the stop cock body SCB and the other saddle flange 12'. By doing this, the former inherent loosening effect for the nut 66 as provided by the sealing O-ring is completely eliminated and avoided.

Figure 14:
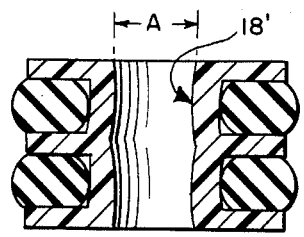
FIG. 14 is a cross-sectional elevational view of an embodiment of the invention shown in FIG. 2.
Figure 15:
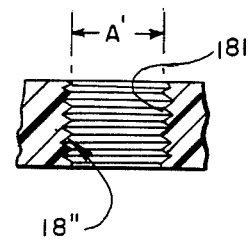
FIG. 15 is a fragmentary portion of a modified hub structure.
Figure 16:
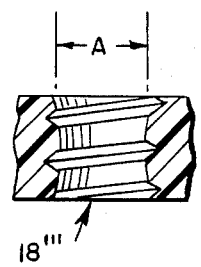
FIG. 16 is a further modified hub structure.
Figure 17:
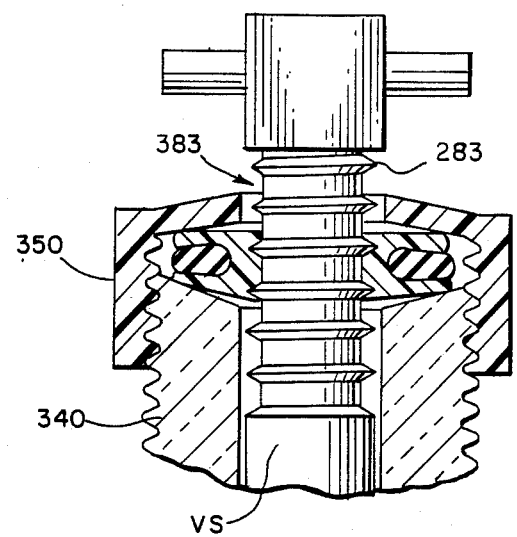
FIG. 17 shows the embodiment of FIG. 16 in use with a valve stem.

FIG. 14 shows a double saddle where two gripping seals are better than one. FIG. 15 shows the internal surface of the hub as being serrated in order to increase the sealing pressures. In FIG. 16 the internal surface is threaded. FIG. 17 shows a saddle sealing on a threaded valve stem such as that shown in the Separatory Funnel application Ser. No. 515,860, now U.S. Pat. No. 4,509,566 and the Quick Turn Meter Valve application Ser. No. 465,115 now abandoned.

FIG. 14 is a cross-section of the saddle showing surface 18' as a double seal and, of course, these could be stacked as many as desired. The idea is to increase the sealing pressure and also increase the total frictional forces on the thermometer or on the tubing when desired. In FIG. 15 surface 18" is shown with a series of circular-angular grooves 181. The purpose of the grooves 181 is to increase the sealing pressure when desired for a more effective seal.

In the case of the separatory funnel and other valves, FIG. 17 shows a quick turn metering valve wherein the sealing means is by machining grooves 383 into the valve stem VS in order to replace various sealing means. In the case of a plastic valve stem, the value of their elimination is primarily cost savings. In the case of a glass valve stem, the deep grooves machined for these seals cause a high stress area in the glass. This causes a serious breakage problem. The elimination of these grooves and sealing on the threaded portion of the valve stem eliminates breakage from this source.

In FIG. 16 surface 18''' is shown with spiral angular grooves 183. This form may take the shape of a standard thread tooth form, or a non-standard tooth shape, such as is shown. The advantage of this non-standard thread is that a large pitch may be used while restricting the depth of the tooth. In other words, an 8-pitch thread can be made, and if 4 leads were made, the thread form would be equal to a 32-pitch thread. If every other lead is skipped, there is then the thread form shown in FIG. 15, with the depth equal to a 32-pitch thread. There are several advantages to this thread form, especially in glass. It allows the use of a small rotation of the stem without having to cut the glass stem to the depth of a standard small pitch thread, thus avoiding the breakage problem.

Another advantage is that the wheel to grind the thread in the glass does not come to a sharp point as the standard tooth form. The surface which does the major portion of grinding is flat and the thickness of at least one tooth thickness. This increases the surface arch and decreases the grinding pressure, allowing the wheel to last longer and to cut faster.

As can be seen from the various embodiments shown and described, the basic invention of the supporting saddle hub structure of plastic, relatively frictionless material, and the deformable yet resilient rubber O-ring together provide for a number of new and useful applications not heretofore known about.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:
1. A sealing structure for use with laboratory apparatus comprising:
   sealing hub means of plastic which has a tendency to creep and flow, but which is resistant to corrosive liquid;
   an O-ring round in cross-section of resilient material made of material which is normally non-resistant to said corrosive liquids;
   said round O-ring being mounted in engagement with said sealing means so as to maintain a residual bias on said sealing means over a long period of time, and which is protected from said corrosive liquids by said sealing means;
   said sealling hub means being in the form of a central hub, said hub having a central aperture which is slightly semicircular in configuration in cross-section and having flanges extending therefrom for reception of said resilient round O-ring therebetween;

a thermometer;

compression means for causing deformation of said sealing means and for sealingly clamping said thermometer;

said compression means including a thermometer adapter for use with said laboratory apparatus;

said O-ring being meade of rubber, and said hub means being made of Teflon; and said thermometer adapter including a central bore having a conical recess, and a compressive cap threadingly mounted upon said adapter for deforming said sealing hub means.

* * * * *